March 10, 1942. J. CHLPKA 2,276,020
ARM REST AND UTILITY LIGHT
Filed Oct. 22, 1940
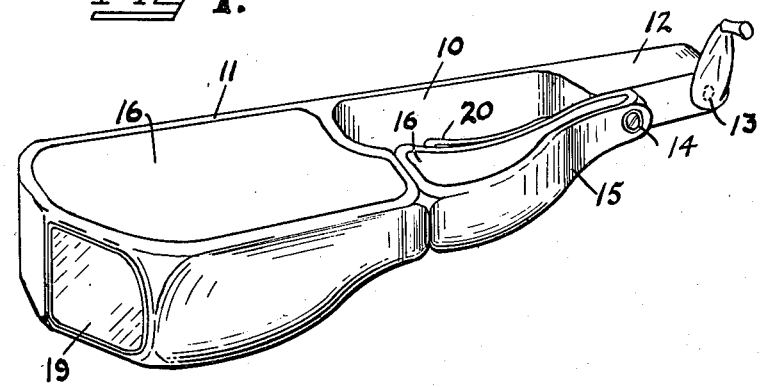
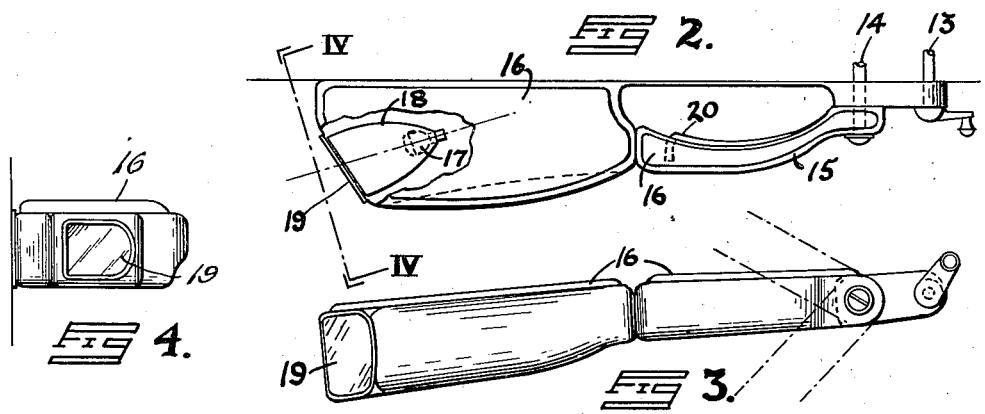
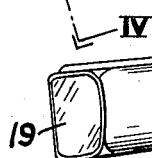
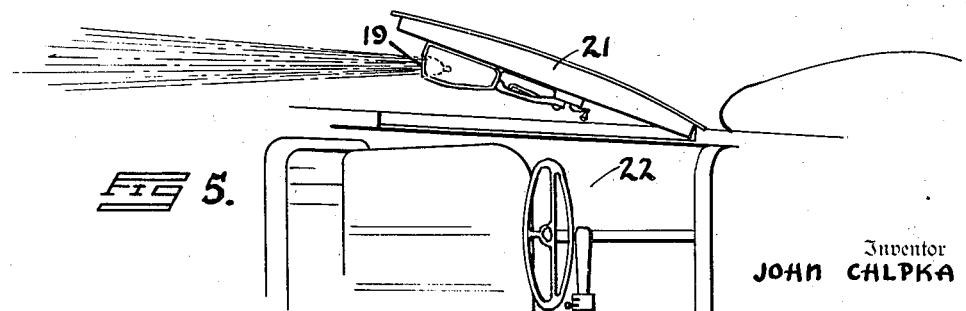
Inventor
JOHN CHLPKA
By W. B. Hoppman
Attorney Patented Mar. 10, 1942

2,276,020

UNITED STATES PATENT OFFICE 2,276,020

ARMREST AND UTILITY LIGHT

John Chlpka, Sharon, Pa.

Application October 22, 1940, Serial No. 362,178

5 Claims. (Cl. 296—1)

This invention relates to an automotive accessory and more particularly to an arm rest incorporating a utility light therein particularly adapted for installation upon the inner surface of the front doors of a motor vehicle.

A further object of the invention is the provision of an arm rest and utility light unit incorporating a door latch handle as a portion thereof and so formed that the door latch handle portion forms a convenient hand-hold for closing the automobile door.

A still further object of the invention is the provision of an arm rest and utility light unit incorporating a door latch lever and window control lever all of which is installed as a single unit thus affording a savings in installation time and labor in replacing the customary window operating lever, door latch and arm rest conventionally installed as individual units.

A further object of the invention is the provision of an attractive and comfortable arm rest of the interior of an automobile door incorporating therewith a utility light positioned within the arm rest in a manner so that illumination directed therefrom at such times as the front door of the automobile is held slightly open will enable the operator thereof to readily determine driving clearances in backing the automobile out of driveways, areaways, and other locations particularly at night time when there is little or no other illumination available.

The combination arm rest, utility light, door latch and window control unit shown and described herein has been designed to facilitate the installation of the customary arm rest, handhold and door latch and window operating levers of an automobile door particularly the door adjacent the driver's seat and at the same time to include therein a utility light which will, at such times as the door is partially open, direct considerable illumination along the side and to the rear of the automobile and thus materially assist the driver in backing the car at night time. The body portion of the device is provided with suitable padding and serves as a comfortable arm rest when the door is closed and the door closing hand-hold and door latch lever are incorporated in the same as a part thereof thus making for attractiveness as well as utility.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed without departing from the spirit of the invention.

The invention is illustrated in the accompanying drawing, wherein:

Figure 1 is a perspective view of the device showing in detail the approximate shape and relative size of the various portions of the device.

Figure 2 is a top plan view with parts broken away showing the device and more particularly the illumination means incorporated therein.

Figure 3 is a side elevation of the device shown in Figure 4 showing in detail the elevation of the padding thereon with respect to the remainder of the device.

Figure 4 is an end view of the device taken on lines 4—4 of Figure 2.

Figure 5 is a view of the device installed in the side of an automobile door and shows a few details of the automobile construction so as to identify the particular location of installation.

By referring to the drawing and Figure 1 in particular it will be seen that the device comprises a mounting plate 10 upon which a body portion 11 forming the main portion of the arm rest is positioned and also upon which a secondary body portion 12 properly perforated for the reception of the window operating lever 13 and the door latch lever 14 is positioned. A door latch lever 15 is affixed to the shaft 14 projecting from the secondary body member 12 and forms in effect a continuation of the body member 11 and at the same time provides a convenient handhold which may be used in pulling the door shut. Suitable pads 16 are positioned on the upper surface of the body member 11 and the lever 15 so as to provide a comfortable arm rest. The device may be mounted on the car door by any conventional means and in order to simplify the disclosure no particular mounting method has been shown. The primary purpose of the device is the provision of a source of illumination which, as may be seen in Figures 2 and 5 of the drawing, comprises an incandescent bulb 17 positioned in a suitable reflector 18 within the body portion 11 of the arm rest, the illumination being directed outwardly therefrom through a transparent section 19.

In actual practice the device would be so wired to the electrical system of the automobile that it would be illuminated only at such times as lights or parking lights of the automobile were in use so that there would be no unnecessary drain on the battery during the daylight hours when no illumination would be needed. By referring to Figures 1 and 2 of the drawing it will be observed that a pressure switch lever 20 is incorporated as part of the door latch lever 15 so that at such times as this lever 15 is grasped by the hand the pressure switch lever 20 is depressed which serves to complete the electrical circuit to the incandescent bulb 17 and thus provide the illumination desired. As may be seen by referring to Figure 5 the door 21 of an automobile 22 is shown in slightly open position as it would be when held by the driver with his hand on the door latch lever 15 so as to depress the pressure switch 20 forming a part thereof and thus cause direction of suitable illumination toward the side and rear of the car which will materially assist the driver in backing the car under certain circumstances. It will thus be seen that I have provided a combination of several features commonly found in automobiles and at the same time added a utility light to the combination in such manner as to provide a desirable feature. The light could also be used to assist the driver in changing a tire on one of the rear wheels at night and could be used for illuminating the area immediately adjacent the sides of the automobile at such times as passengers are either getting into or out of the automobile. It will also be seen that the device forms a single attractive unit which may be installed in new automobiles in a single operation rather than the several operations necessary for the installation of the various arm rests, door latches and window operating levers commonly used. It will also be noted that the device can be formed of plastic material or of metal and that the pads can be of suitable upholstery material or of rubber and that the unit as a whole forms an attractive article of interior decoration in the automobile.

Having thus described by invention, what I claim is:

1. In a device of the class described, the combination of a body member forming an arm rest adapted to be affixed to the inner surface of an automobile door, one end of the said body member tapered in relation to the mounting side thereof, and a light positioned in the said tapered end of the body member adapted to illuminate the area at the side and rear of the automobile at such times as the door to which the arm rest is attached is partially open.

2. In an automotive vehicle body, an arm rest, comprising a pair of body members spaced apart, a manually operatable lever handle movably mounted between the said body members and on a plane therewith, one of the said body members comprising the arm rest having a recess in an end thereof, a light positioned in the said recess adapted to illuminate the area at the side and rear of the automotive vehicle body at such times as the door portion of the said body to which the arm rest is attached is partially open.

3. In an automotive vehicle body having a door and a door latch, an arm rest mounted on the inner surface of the door, the said arm rest comprising a pair of body members spaced apart, a recess formed in the said arm rest adjacent the latch of the door, a light positioned in the said recess adapted to illuminate the area at the side and rear of the automotive vehicle body at such times as the door to which the device is affixed is partially open.

4. A utility light adapted to be installed upon the inner surface of an automobile door so as to illuminate the area at the side and rear of the automobile at such times as the door to which the utility light is attached is partially open and comprising a rectangular body member tapered at one end and having a recess formed in the said tapered end and a light source positioned in the said recess, the said utility light positioned upon the said door so that the uppermost portion thereof forms a convenient arm rest.

5. A utility light adapted to be positioned on the inner surface of an automobile door and formed so as to illuminate the area outside the vehicle at such times as the door is partially open and comprising a rectangular body having the recess formed at one end, a light positioned in the said recess and directed toward the latch edge of the said door, the said rectangular body being of narrower width at the opposite end and positioned upon the said door so as to form a convenient arm rest.

JOHN CHLPKA.